US009065986B2

(12) United States Patent
Mizutani et al.

(10) Patent No.: US 9,065,986 B2
(45) Date of Patent: Jun. 23, 2015

(54) IMAGING APPARATUS AND IMAGING SYSTEM

(75) Inventors: Aritaka Mizutani, Kyoto-fu (JP); Yusuke Fujita, Osaka-fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 796 days.

(21) Appl. No.: 12/557,922

(22) Filed: Sep. 11, 2009

(65) Prior Publication Data

US 2010/0066829 A1    Mar. 18, 2010

(30) Foreign Application Priority Data

Sep. 12, 2008   (JP) ................................. 2008-235757
Aug. 3, 2009    (JP) ................................. 2009-180959

(51) Int. Cl.
*H04N 7/18*     (2006.01)
*G08B 13/196*   (2006.01)
*H04N 5/262*    (2006.01)

(52) U.S. Cl.
CPC .......... *H04N 7/183* (2013.01); *G08B 13/19682* (2013.01); *H04N 5/262* (2013.01)

(58) Field of Classification Search
USPC .......... 348/143, 135, 388; 382/190, 192, 195, 382/203, 205, 206
See application file for complete search history.

(56) References Cited

U.S. PATENT DOCUMENTS

| | | | | |
|---|---|---|---|---|
| 7,336,279 | B1 * | 2/2008 | Takiguchi | 345/473 |
| 2004/0085447 | A1 * | 5/2004 | Katta et al. | 348/143 |
| 2005/0207487 | A1 * | 9/2005 | Monroe | 375/240.01 |
| 2006/0004743 | A1 * | 1/2006 | Murao et al. | 707/4 |
| 2006/0050086 | A1 * | 3/2006 | Ono | 345/629 |
| 2006/0072811 | A1 * | 4/2006 | Porter et al. | 382/159 |
| 2008/0260255 | A1 * | 10/2008 | Fukushima et al. | 382/190 |
| 2009/0128667 | A1 * | 5/2009 | Gloudemans et al. | 348/241 |
| 2009/0135269 | A1 * | 5/2009 | Nozaki et al. | 348/222.1 |

FOREIGN PATENT DOCUMENTS

| | | |
|---|---|---|
| JP | 2002-314984 A | 10/2002 |
| JP | 2003-9138 A | 1/2003 |

OTHER PUBLICATIONS

English language abstract and partial translation for JP 2002-314984 A published Oct. 25, 2002.

* cited by examiner

*Primary Examiner* — Tracy Li
(74) *Attorney, Agent, or Firm* — Novak Druce Connolly Bove + Quigg LLP

(57) ABSTRACT

The present invention provides an imaging apparatus capable of monitoring a plurality of monitored sites in a switching manner by a single surveillance camera and an imaging system. Provided are: an imager for imaging an object scene image so as to produce imaging data; a cutout processor for cutting out one portion of the imaging data so as to create a plurality of cutout image data; and an outputter for sequentially outputting the plurality of cutout image data to the external apparatus at a predetermined output interval.

7 Claims, 12 Drawing Sheets

FIG. 11
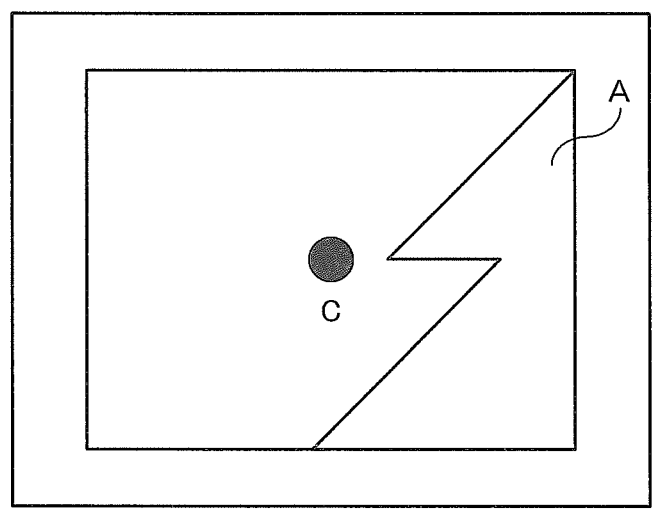
(a)
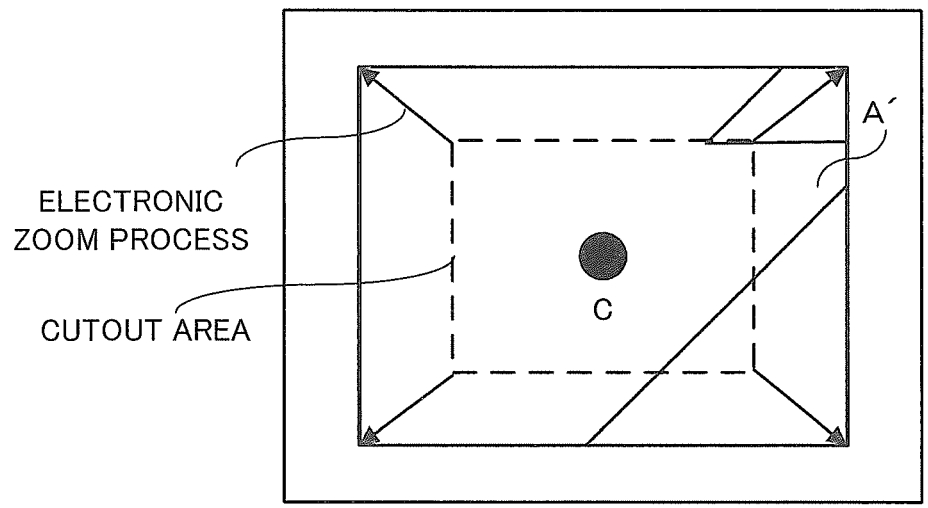
(b)

IMAGING APPARATUS AND IMAGING SYSTEM

CROSS REFERENCE OF RELATED APPLICATION

The disclosure of Japanese Patent Application Nos. 2008-235757 and 2009-180959, which were filed on Sep. 12, 2008 and Aug. 3, 2009, respectively, are incorporated herein by reference.

BACKGROUND OF THE INVENTION

1. Field of the Invention

The present invention relates to an imaging apparatus and an imaging system. More particularly, the present invention relates to an imaging apparatus for selecting an arbitrary area from an image based on an image signal outputted from the imaging apparatus and outputting an image in the selected area to an external apparatus, and relates also to an imaging system.

2. Description of the Related Art

Conventionally, there is appreciatedly used a surveillance camera system for monitoring a plurality of monitored sites by using a plurality of surveillance cameras.

One example of this type of a surveillance camera system is configured to use a plurality of surveillance cameras including a surveillance camera having an orbiting function so as to select and display a monitored video about a plurality of monitored sites of the plurality of surveillance cameras. Specifically, there is disclosed a technology capable of promptly displaying a desired monitored site or monitored position by displaying data about the monitored site or monitored position on a manipulation screen on which the monitored video is selected and displayed and allowing a user to select the desired monitored site or monitored position based on the data, However, the surveillance camera of the conventional technology is disadvantageous for the user due to the following points:

(1) In order to monitor a plurality of sites at one time, it is necessary to provide a plurality of cameras and a video switching apparatus;

(2) When an image pickup element having a large total number of pixels is adopted as the surveillance camera, it is certain that when an imaging signal obtained by imaging a subject is displayed on a monitor capable of displaying a high-resolution image, it is possible to view a high-resolution image. However, in order to display the image based on the imaging signal, on a monitor not capable of displaying the high-resolution image, a scaler process for degrading a resolution is performed. In the scaler process, an unnecessary process is performed on the original imaging signal, and thus, an image quality of the image based on the processed imaging signal is lowered. Also, an image of an overall angle of field is displayed on the monitor, it is therefore probable that a site intended to monitor cannot be monitored; and (3) Furthermore, when a surveillance camera mounted thereon with an optical zoom is adopted so as to perform an optical zoom process, center of a subject is enlarged as a point of center in the optical zoom process, and thus, it is probable for the user not to be able to view an image in which a desired location is enlarged.

SUMMARY OF THE INVENTION

An imaging apparatus according to the present invention, comprises: an imager for imaging an object scene image so as to produce imaging data; a cutout processor for cutting out one portion of the imaging data so as to create a plurality of cutout image data; and an outputter for sequentially outputting the plurality of cutout image data to an external apparatus at predetermined output intervals.

Preferably, there is further provided an assigner for assigning to each of the plurality of cutout image data an order for outputting to the external apparatus, in which the outputter sequentially outputs the plurality of cutout image data to the external apparatus at predetermined output intervals, based on the order assigned by the assigner.

Further preferably, there is further provided a setter for setting a zoom factor to each of the plurality of cutout image data, in which the cutout processor cuts out one portion of the imaging data based on each zoom factor set by the setter so as to create the plurality of cutout image data.

According to the present invention, an imaging system configured by: an imaging apparatus for imaging an object scene image so as to produce imaging data and outputting the imaging data an image processing apparatus for accepting the imaging data outputted from the imaging apparatus; and an external apparatus for displaying an image based on the imaging data outputted from the imaging apparatus on a first displayer, in which the image processing apparatus comprises: a display processor for displaying an image based on the imaging data on a second displayer; and an area designator for designating a plurality of arbitrary areas from the image displayed by the second displayer, and the imaging apparatus comprises: a cutout processor for creating a plurality of cutout image data by cutting out one portion of the imaging data, based on the plurality of arbitrary areas designated by the area designator provided in the image processing apparatus; and an outputter for sequentially outputting the plurality of cutout image data to the first displayer at predetermined output intervals.

Preferably, the imaging apparatus further comprises an assigner for assigning an order for outputting to the first displayer, to each of the plurality of cutout image data, and the outputter sequentially outputs the plurality of cutout image data to the first displayer at predetermined output intervals, based on the order assigned by the assigner.

Further preferably, there is further provided a setter for setting a zoom factor to each of the plurality of cutout image data, in which the cutout processor cuts out one portion of the imaging data based on each zoom factor set by the setter so as to create the plurality of cutout image data.

Preferably, the external apparatus is a monitor connected by a cable to the imaging apparatus.

Preferably, the external apparatus is an information processing apparatus connected to the imaging apparatus via a network.

Preferably, the external apparatus is a monitor connected by a cable to the imaging apparatus.

Preferably, the external apparatus is an information processing apparatus connected to the imaging apparatus via a network.

The above described features and advantages of the present invention will become more apparent from the following detailed description of the embodiment when taken in conjunction with the accompanying drawings.

BRIEF DESCRIPTION OF THE DRAWINGS

FIG. 11 is an illustrative view of an image display in the interval display mode displayed on a monitor provided in an information processing apparatus, which is the second embodiment of the present invention.

DETAILED DESCRIPTION OF THE PREFERRED EMBODIMENTS

First Embodiment

A first embodiment will be described by using, as one example of an imaging apparatus and an imaging processing system of the present invention, a mode of a surveillance camera system 2 configured by: a surveillance camera 10; an image processing apparatus 14 that is connected via a LAN cable to the surveillance camera 10 and that is inputted an image signal outputted from the surveillance camera 10; and a monitoring monitor 12 connected via a composite cable to the surveillance camera 10.

Figure 1:
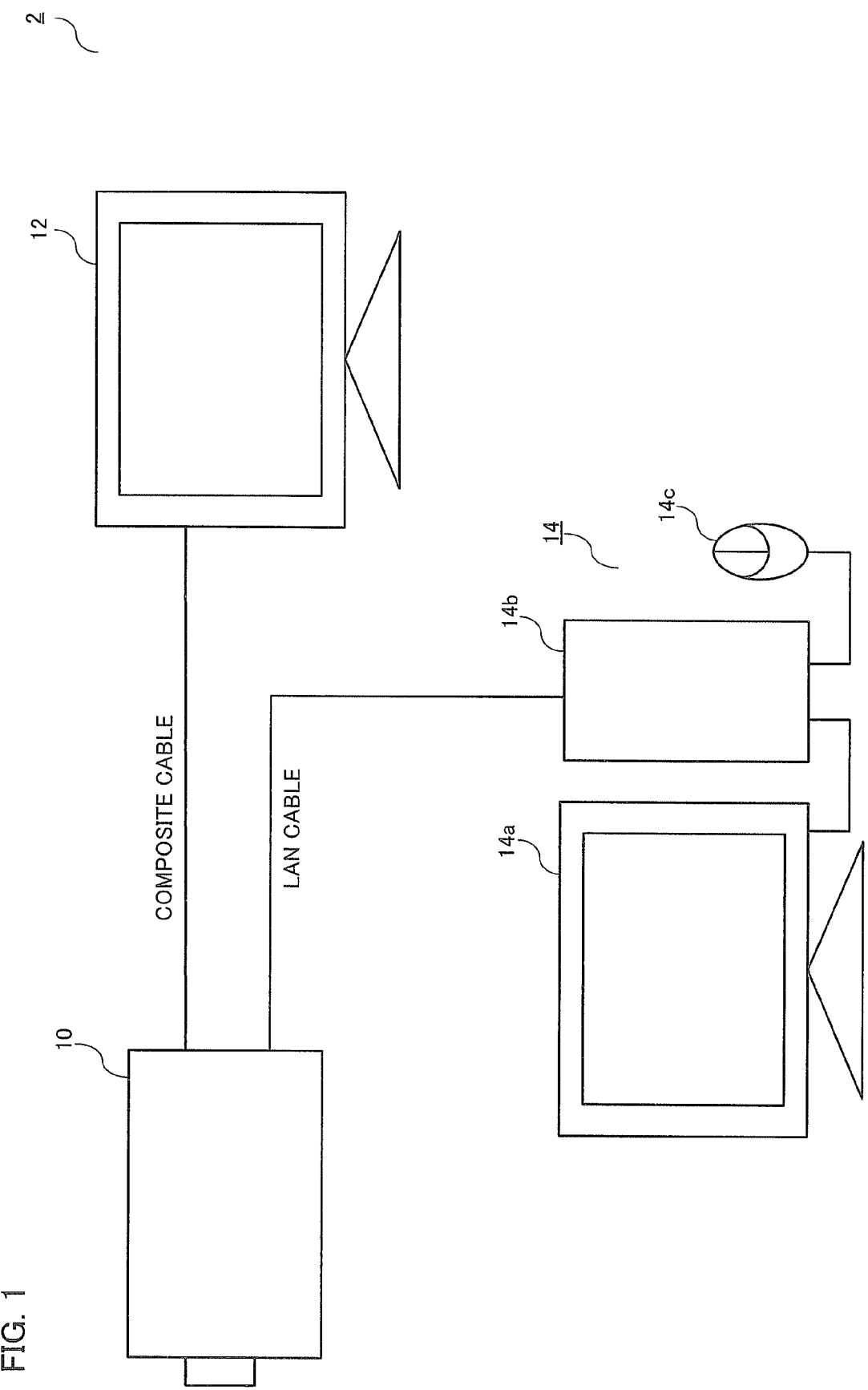
FIG. 1 is a diagram showing a connection example among an image processing apparatus, a surveillance camera, and a monitoring monitor, which is a first embodiment of the present invention.

FIG. 1 shows a connection example of the surveillance camera 10, the monitoring monitor 12, and the image processing apparatus 14, of the first embodiment. The image processing apparatus 14 is connected via the LAN cable to the surveillance camera 10, and the monitoring monitor 12 is connected via the composite cable to the surveillance camera 10. The image processing apparatus 14 is configured to include an LCD monitor 14a, a signal processing apparatus 14b, and a pointing device 14c. Compressed image data obtained by performing a signal process on an image signal that is produced by being imaged by the surveillance camera 10 is inputted via the LAN cable in the signal processing apparatus 14b. Also, the image signal produced by the surveillance camera 10 is converted to a video signal, which is inputted via the composite cable in the monitoring monitor 12.

In the monitoring monitor 12, monitoring by the user is done, and the compressed image data inputted in the signal processing apparatus 14b is set based on the compressed image data within the signal processing apparatus 14b, for a recording process of the compressed image data and the monitoring by the user in the monitoring monitor 12.

Figure 2:
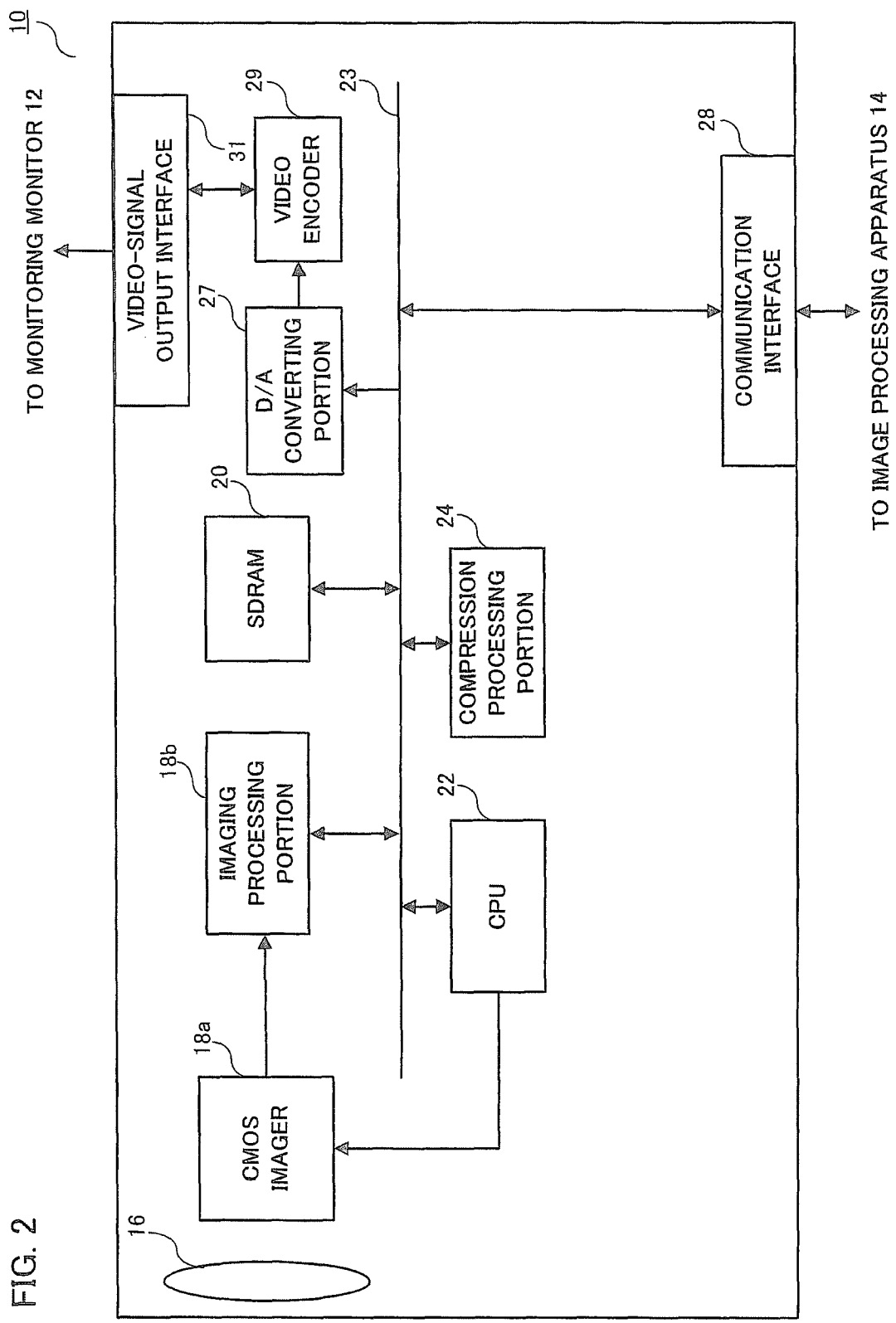
FIG. 2 is a block diagram showing a configuration of the surveillance camera, which is the first embodiment of the present invention.

Next, by using FIG. 2 which is a block diagram of inside the surveillance camera 10 shown in FIG. 1, the surveillance camera 10 will be described in detail.

The surveillance camera 10 is configured to include: an imaging lens 16, a CMOS imager 18a, an imaging processing portion 18b, an SDRAM 20, a CPU 22, a compression processing portion 24, a flash ROM 26, a D/A converting portion 27, a communication interface 28, a video encoder 29, a bus 23, and a video-signal output interface 31.

The imaging lens 16 forms an optical image of a subject on an imaging surface of the CMOS imager 18a, which is an imaging device. Herein, in the first embodiment, the CMOS imager 18a having a large total number of pixels, for example, a CMOS imager having, as an effective image area, 2528×1788 (vertical×horizontal) pixels, is adopted.

Furthermore, the imaging lens 16, based on an output signal of the CMOS imager 18a, is regulated in movement in an optical-axis direction by a lens motor (not shown) controlled by the CPU 22. An analog imaging signal outputted from the CMOS imager 18a is inputted in the imaging processing portion 18b, and the inputted analog imaging signal is subjected to various processes such as an A/D converting process, a CDS process, a signal amplifying process, and a clamping process. The processed digital imaging signal is temporarily accommodated in an SDRAM 20.

The digital imaging signal accommodated in the SDRAM 20 is inputted in the imaging processing portion 18b, and by the imaging processing portion 18b, the resultant signal is subjected to various signal processes such as a color separating process, an AWB process, and a YUV converting process. As a result, a Y signal that is a luminance signal and U and V signals that are color difference signals are produced, and these signals are again accommodated in the SDRAM 20 as digital image data. Herein, the digital imaging signal based on output of the CMOS imager 18a is thinned out when undergoing the color separating process, the YUV converting process, etc., and thus, a size of the digital image data accommodated again in the SDRAM 20 becomes smaller.

The imaging lens 16, the imaging processing portion 18b, the SDRAM 20, the compression processing portion 24, the D/A converting portion 27, and the communication interface 28 are controlled via the bus 23 by the CPU 22.

The CPU 22 uses the communication interface 28 so as to accommodate instructing/setting data outputted from the image processing apparatus 14 in an SDRAM 20 or a register (not shown) within the CPU 22. For example, when an imaging start instruction is outputted from the image processing apparatus 14, for example, the CPU 22 executes an imaging process. Moreover, the instructing/setting data may be pan/tilt control data for controlling a motor for panning/tilting a lens unit (not shown) including the imaging lens 16 of the surveillance camera 10.

Next, with respect to the imaging process of the surveillance camera 10 of the first embodiment, control of the CPU 22 will be mainly described. When accepting the imaging start instruction from the image processing apparatus 14, the CPU 22 repeatedly produces the Y, U, and V signals according to a predetermined frame rate by controlling the imaging lens 16, the CMOS imager 18a, the imaging processing portion 18b, and the SDRAM 20. Herein, the predetermined frame rate is an arbitrary frame rate set to the register (not shown) of the CPU 22 before the surveillance camera 10 starts imaging or after starting imaging.

The Y, U, and V signals are again accommodated in the SDRAM 20 via the bus 23, and are repeatedly inputted in the compression processing portion 24. Then, the compression processing portion 24 performs a compressing process on the Y, U, and V signals according to an H264 system or a JPEG system as a compressing process, and image compression data produced by the compressing process is again accommodated via the bus 23 in the SDRAM 20.

Subsequently, the image compression data accommodated in the SDRAM 20 is outputted from the communication interface 28 to the image processing apparatus 14.

Now, the surveillance camera 10 is provided with an interval display mode in which an image (video signal) is outputted at a predetermined updating interval (interval) to the monitoring monitor 12 so that the image is displayed thereon. The interval display mode is arranged in order to monitor a plurality of monitored sites in a switching manner with the single surveillance camera 10. As described above, as a result of being thinned out in the color separating process, etc., based on the output of the CMOS imager 18a, the digital image data accommodated in the SDRAM 20 is configured by a size of which one frame is 1920×1080 (vertical×horizontal) pixels (aspect ratio of 16:9), for example. However, in terms of an image size displayed on the monitoring monitor 12, an image having an SD size of 720×480 (vertical×horizontal) pixels (aspect ratio of 4:3) may suffice. The size is so determined due to the fact, conversely speaking, that it is probable that an image quality is degraded when a scaling process is performed on a high-resolution image in order to lower the resolution.

In the interval display mode, firstly, the digital image data based on the output of the CMOS imager 18a is accommodated in the SDRAM 20. Herein, as described above, one frame of the digital image data is configured by a Full-HD size having 1920×1080 (vertical×horizontal) pixels (aspect ratio of 16:9), the image displayed on the monitoring monitor 12, however, is an image of an SD size having 720×480 (vertical×horizontal) pixels (aspect ratio of 4:3).

The digital image data accommodated in the SDRAM 20 is executed in an image processing apparatus 14 (this is described later). In order to correspond to an SD-sized arbitrary area—set in a display setting process for performing a setting of the interval display mode—that the users intends to monitor by giving a special attention, the CPU 22 performs a cutout process. Specifically, setting data including a plurality of arbitrary areas, an arbitrary interval speed, and a display order, set in the image processing apparatus 14 is inputted from the image processing apparatus 14 in the surveillance camera 10 via the communication interface 28.

The CPU 22 accommodates the setting data in the SDRAM 20, and also accommodates the same in the flash ROM 26. This accommodating process of the setting data in the flash ROM 26 is a process performed for the purposes of data back up in the event where an electric power supply to the surveillance camera 10 is cut off due to a power failure, etc., and thus, the setting data accommodated in the register within the CPU 22 is erased.

The CPU 22 recognizes the plurality of arbitrary areas, the arbitrary interval speed, and the display order based on the setting data accommodated in the SDRAM 20, performs the cutout process on the Full HD-sized digital image data accommodated in the SDRAM 20 so as to change to the SD-sized image data. The resultant data is converted to an analog video signal in the D/A converting portion 27, and outputted to the video encoder 29. In the video encoder 29, the outputted data is converted to a video signal of an NTSC system, and outputted to the monitoring monitor 12 via a video-signal output interface 31.

Figure 3:
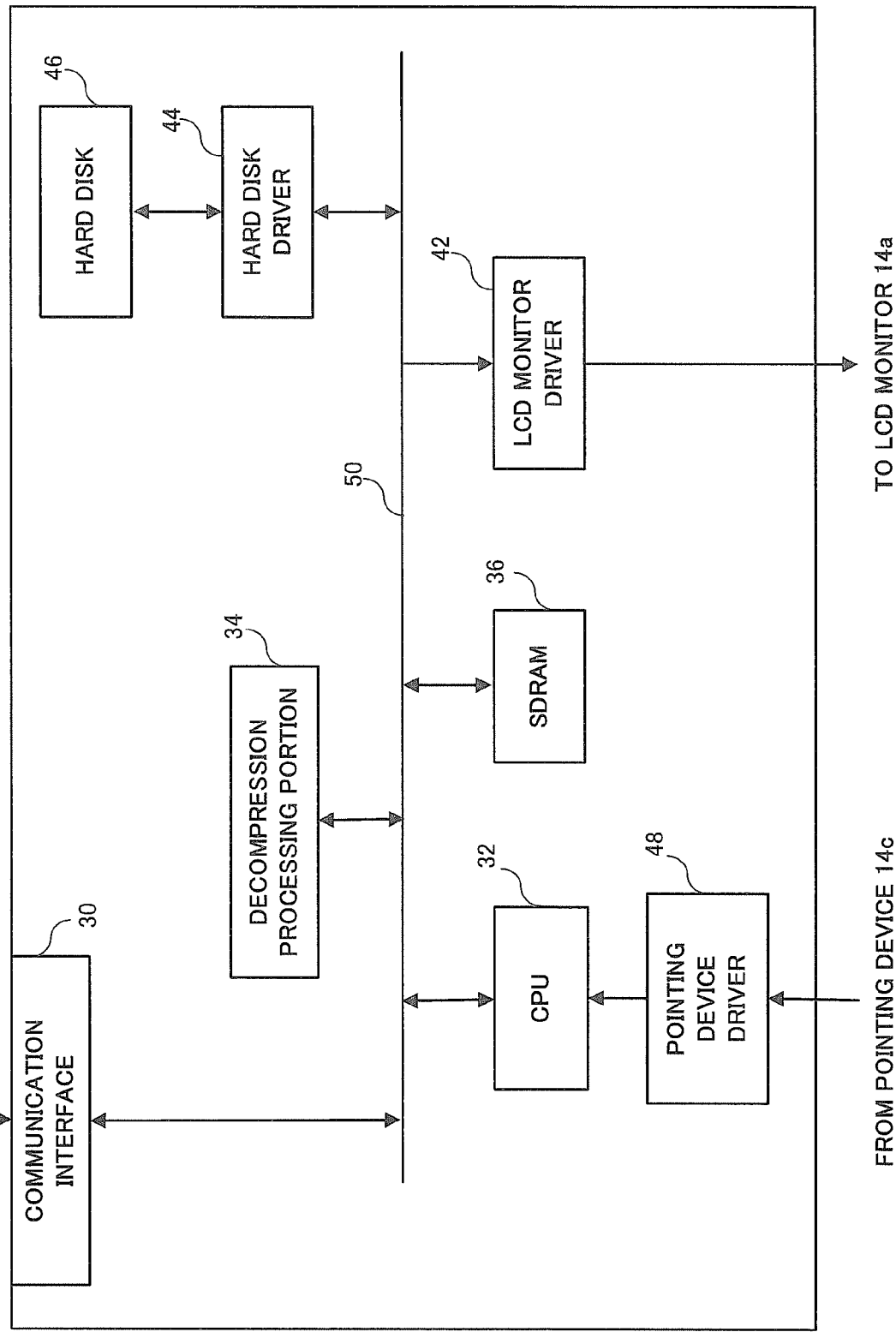
FIG. 3 is a block diagram showing a configuration of the image processing apparatus, which is the first embodiment of the present invention.

Next, by using FIG. 3 which is a block diagram of inside the image processing apparatus 14 shown in FIG. 1, the image processing apparatus 14 will be described in detail. As described previously, the image processing apparatus 14 is configured by the LCD monitor 14a, the signal processing apparatus 14b, and the pointing device 14c.

The signal processing apparatus 14b is configured by: a communication interface 30, a CPU 32, a decompression processing portion 34, an SDRAM 36, an LCD monitor driver 42, a hard disk driver 44, a hard disk 46, a pointing device driver 48, and a bus 50.

The CPU 32 controls the communication interface 30, the decompression processing portion 34, the SDRAM 36, the LCD monitor driver 42, and the hard disk driver 44, via the bus 50. Furthermore, the CPU 32 is connected also to the pointing device driver 48. When the pointing device 14c is manipulated, position information, outputted from the pointing device 14c, of a cursor on the LCD monitor 14a is inputted in the CPU 32 via the pointing device driver 48.

Moreover, the LCD monitor driver 42 is connected to the LCD monitor 14a, and decompressed image data is displayed, as an image, on the LCD monitor 14a. The hard disk driver 44 is connected to the hard disk 46, and the compressed image data compressed by an H264 system or a JPEG system is recorded in the hard disk 46.

Next, a process performed in the image processing apparatus 14 of the compressed image data outputted from the surveillance camera 10 will be described. The image processing apparatus 14 in the first embodiment executes the recording process for recording the compressed image data in the hard disk 46 and the display setting process for performing setting of the interval display mode in which the SD-sized image obtained by performing the cutout process on the Full HD-sized image is displayed on the monitoring monitor 12 at the predetermined updating interval (interval).

Figure 6:
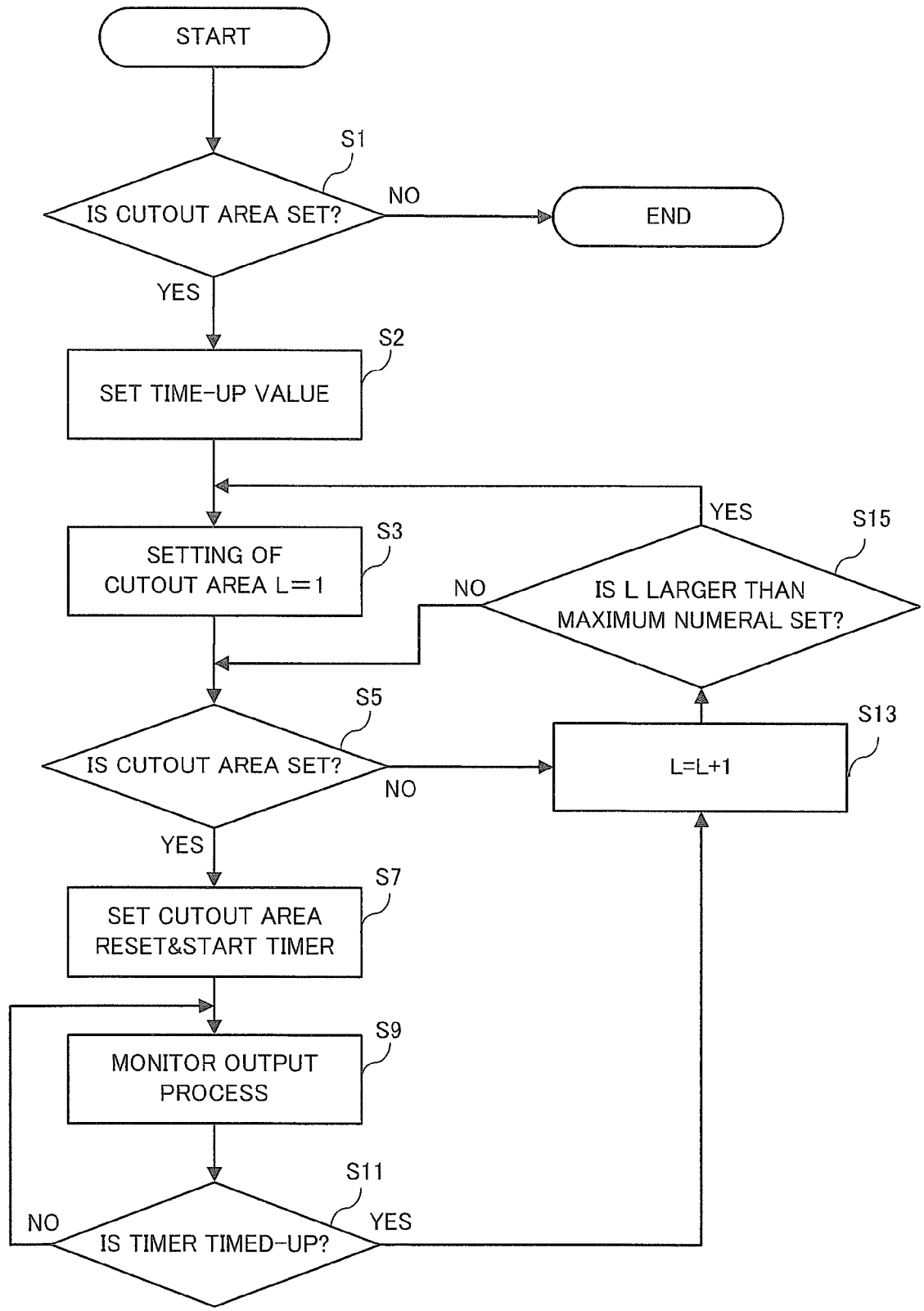
FIG. 6 is a flowchart showing one portion of an operation of the surveillance camera, which is the first embodiment of the present invention.

The display setting process of the interval display mode in the surveillance camera 10 will be described with reference to a display setting screen shown in FIG. 4 and FIG. 6.

Firstly, the recording process will be described. The compressed image data (from the surveillance camera 10) compressed by the H264 system is inputted via the LAN cable in the communication interface 30, and is temporarily inputted in the SDRAM 36 via the bus 50. Then, the CPU 32 controls the SDRAM 36 and the hard disk driver 44 so as to record the compressed image data in the hard disk 46.

Next, the display setting process for performing setting of the interval display mode will be described by using FIG. 4. In this display setting process, mainly, a plurality of arbitrary areas that the user intends to monitor by giving a special attention are set, and an arbitrary interval speed is set.

Figure 4:
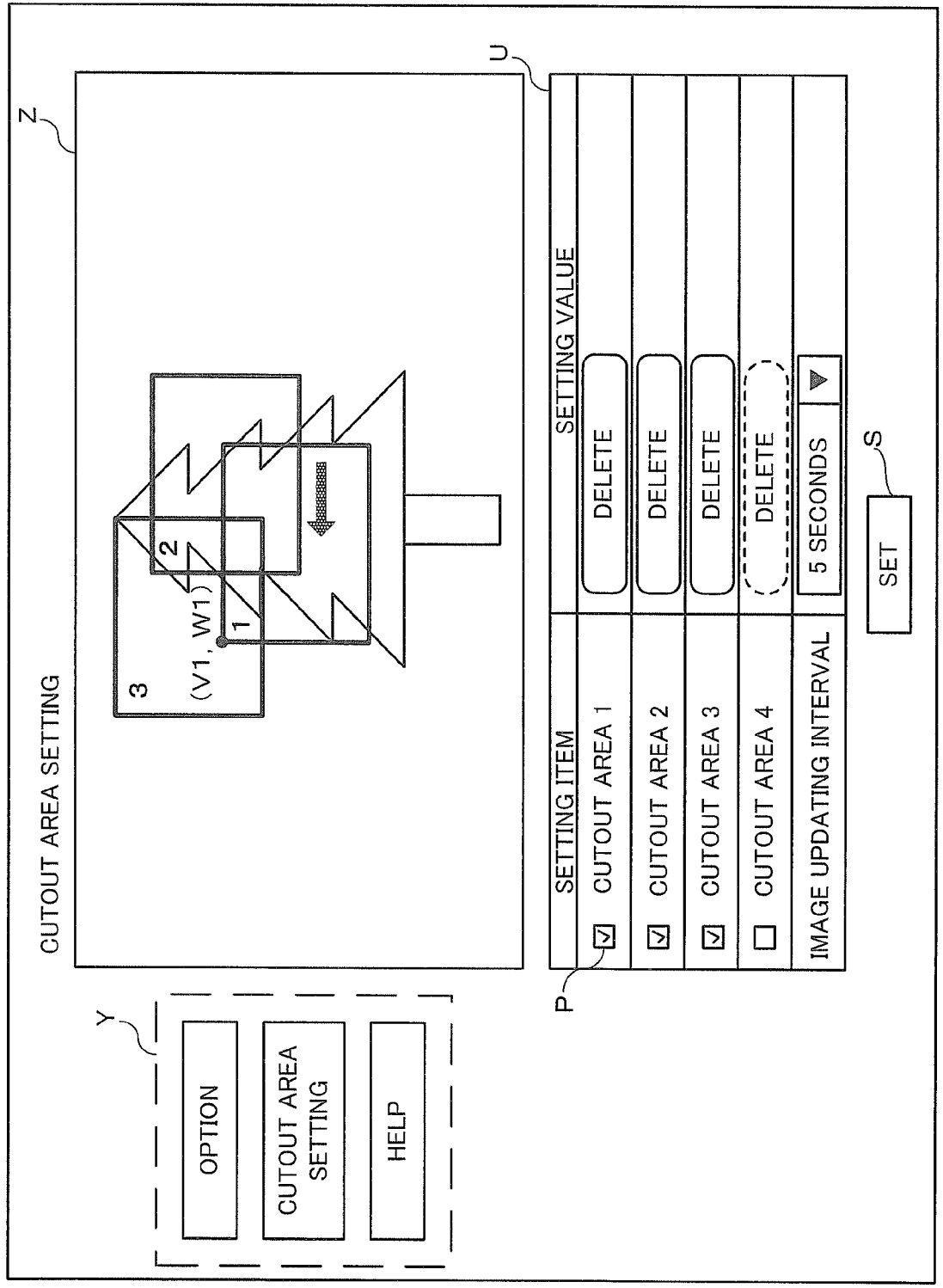
FIG. 4 is an illustrative view showing a setting screen of an interval display mode displayed on an LCD monitor 14a, which is the first embodiment of the present invention.

FIG. 4 shows a setting screen for performing setting of the interval display mode. As shown in FIG. 4, on the left side of the setting screen, three marks—three buttons in the first embodiment—are displayed in a mark area Y in a superimposed manner. The three buttons are displayed by the CPU 32 in a manner to be superimposed in the mark area Y based on a program accommodated in a flash memory not shown. Specifically, the three buttons are "option", "cutout area setting", and "help" buttons. Then, in order that the buttons are selected by the manipulation from the pointing device 14c, a graphical user interface (GUI) function is mounted in the image processing apparatus 14 in the first embodiment.

On an upper right side of the setting screen, an image based on the compression image signal, which is a JPEG image compressed by a JPEG system, is displayed in a cutout setting area Z. On a lower right side of the setting screen, setting items and setting values are displayed by using marks in a setting modifying area U. Then, selecting/setting based on this setting screen also adopts the GUI function, and thus, when the pointing device 14c is manipulated, it becomes possible to perform the selecting/setting.

In the cutout setting area Z, a thinning-out process is so performed that an image of compressed image data having an aspect ratio of 16:9 and having 1920×1080 (horizontal×vertical) pixels is changed to an image of the same aspect ratio of 16:9, and the resultant image is displayed. Also, on the setting modifying area U, a cursor corresponding to a motion of the pointing device 14c is displayed. The pointing device 14c, which is like a mouse, for example, moves its main body in a horizontal direction or a vertical direction, senses the movement by using a sensor that utilizing a ball, infrared, a laser, etc., and outputs 2-dimensional moving distance information to the CPU 32, or when a left-click manipulation is performed, the pointing device 14c outputs left click information to the CPU 32. Based on the moving distance information, the CPU 32 displays the movement of the cursor on the cutout setting area Z, or recognizes the selecting/setting based on the left-click information.

Next, a method of setting an arbitrary area in the cutout setting area Z will be described. When the left-click manipulation is performed on the pointing device 14c by the user, a rectangular framework corresponding to the SD-sized area is displayed in the cutout setting area Z. Then, when the user manipulates the pointing device 14c in the horizontal and vertical directions, the cursor is moved within the framework, and when the left-click manipulation is performed at a point at which the cursor is moved within the framework and the pointing device 14c is manipulated in the horizontal and vertical directions while continuing the left-click manipulation by the user, the framework is moved on the cutout setting area Z. When the left-click manipulation is canceled at a user's arbitrary position, the movement of the framework is interrupted. When the left-click manipulation by the pointing device 14c is performed by the user on a mark, i.e., a set button S in the first embodiment, displayed below the setting modifying area U, the arbitrary area is finalized, and the finalized arbitrary area is set as the cutout area.

Specifically, the CPU 32 calculates a position address based on a coordinate (V1, W1)(at an upper left corner of the framework forming a rectangle) of an image having an aspect ratio of 16:9 currently displayed in the cutout setting area Z, and records the calculated position address as the cutting-out area in the SDRAM 36 and also records a corresponding number "1" in association with the cutout area. At this time, the CPU 32 displays a framework corresponding to the set cutout area on the cutout setting area Z, and the number "1" at the upper left within the framework. This framework and number correspond to a "cutout area 1" in a setting item column in the setting modifying area U. Also, in order to allow the user to view easily, it is so displayed that a color of the framework corresponding to "cutout area 1" is rendered blue, a color of the framework corresponding to "cutout area 2" is rendered pink, and a color of the framework corresponding to "cutout area 3" is rendered green.

By using a manipulation similar to that described above, the user is able to set the "cutout area 2" and the "cutout area 3".

Then, it is assumed that as shown in FIG. 4, the "cutout area 1", the "cutout area 2", and the "cutout area 3" are currently set. Herein, "DELETE" in the setting value corresponding to the "cutout area 1" in the setting item column is also displayed by a button or mark. The "DELETE" button changes in color depending on a setting state. As described above, when the cutout area is set by the user, the "DELETE" button is modified. Specifically, the color of a button before being set is displayed in a color that is not prominent relative to a background color, for example, grey. Then, when the setting is performed, the color of a button is modified to a color that is prominent relative to the background color, for example, white. Herein, the "cutout area 4" is not set. Thus, the "DELETE" button in the setting value corresponding to the "cutout area 4" or setting item is expressed in grey.

To be specifically described by using FIG. 4, the "cutout area 1", the "cutout area 2", and the "cutout area 3" are set, and for the sake of illustration, the "DELETE" buttons corresponding to the respective areas are expressed in a manner to be surrounded by a solid line. However, in reality, characters of this button, i.e., "DELETE", are expressed in black, and portions other than the characters surrounded by the solid line are expressed in white.

Moreover, in FIG. 4, for the sake of illustration, the "DELETE" button corresponding to the "cutout area 4" is expressed in a manner to be surrounded by a dotted line. However, in reality, characters of this button, i.e., "DELETE", are expressed in black, and portions other than the characters surrounded by the dotted line are expressed in grey. The CPU 32 also records color information about each of the "DELETE" buttons, in the SDRAM 36.

In the setting modifying area U, there are displayed "image updating interval" as a setting item, and a pull-down button (which is a mark) as a setting value corresponding to that setting item. Herein, the "image updating interval" is an interval speed in the above-described interval display mode. The user performs the left-click manipulation on "▼" in the pull down button by using the pointing device 14c, and when the user performs the left-click manipulation on a desired interval speed from among a plurality of interval speeds such as "3 seconds", "5 seconds", "1 minute", and "3 minutes", each of which is displayed in a vertical direction, the interval speed is selected.

Then, when the user performs the left-click manipulation on a set button S, the interval speed is set. In FIG. 4, "5 seconds" is set as the interval speed.

Moreover, in the setting item column within the setting modifying area U, check boxes P are arranged, to the left of and adjacent to, character strings of "cutout area 1" to "cutout area 4", which are the setting items. When the user performs the left-click manipulation on each check box P by using the pointing device 14c, the check marks are entered. As a result of such a manipulation being performed, the cutout area in which the check mark is entered is set as a cutout area to be displayed in the interval display mode.

On the setting screen in the interval display mode, when the pointing device 14c is manipulated by the user, the setting data relating to the set cutout area, the interval speed, the number, etc., are outputted to the surveillance camera 10. The CPU 22 of the surveillance camera 10 performs an interval display process in the interval display mode based on the setting data inputted from the image processing apparatus 14.

The interval display process will be described with reference to FIGS. 5(a) to 5(c). FIGS. 5(a) to 5(c) show diagrams in which the images corresponding to the set cutout areas 1 to 3 are displayed on the monitoring monitor 12 in setting the above-described interval display mode.

Figure 5:
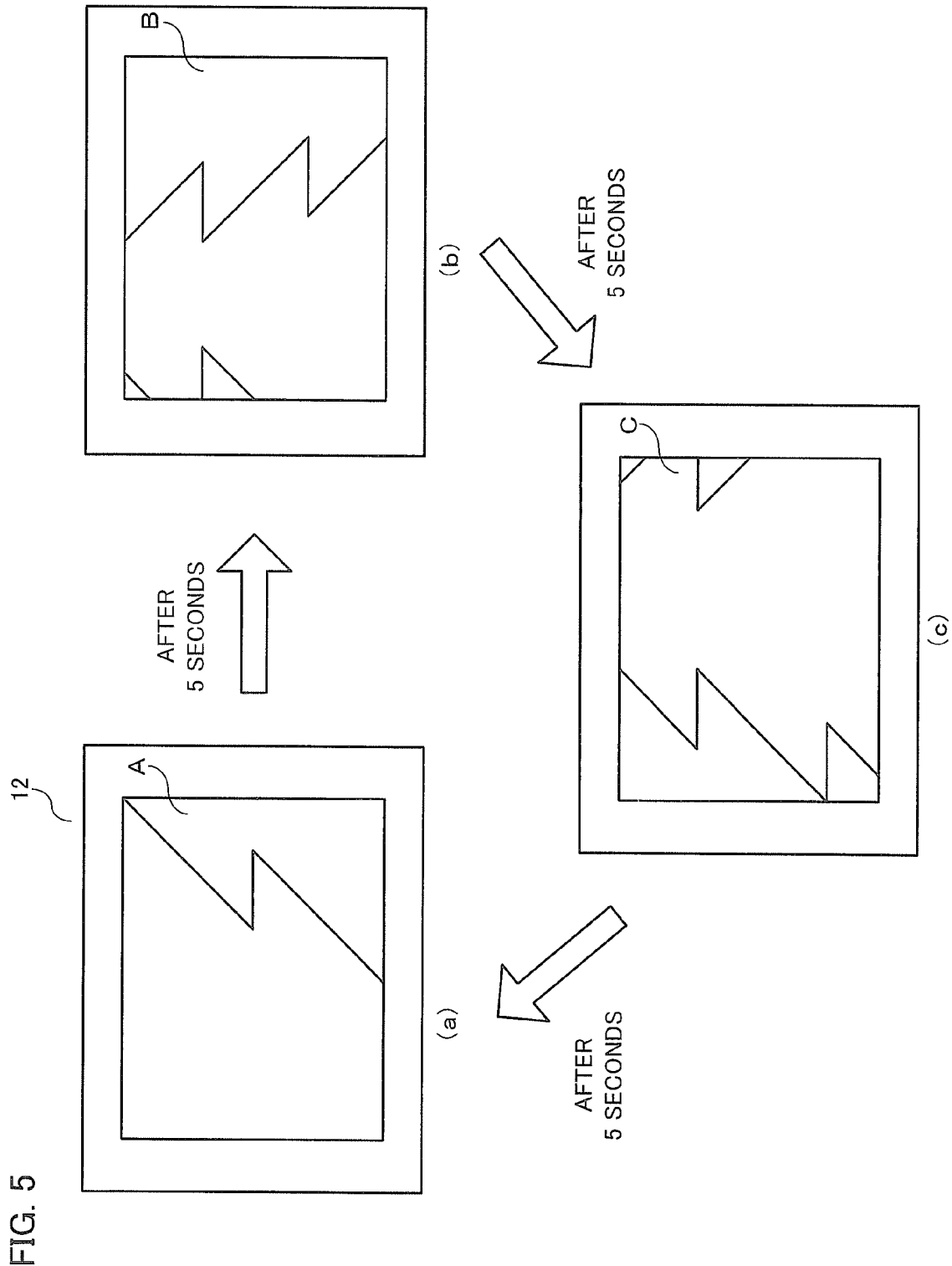
FIG. 5 is a transition diagram of an image display in the interval display mode displayed on the monitoring monitor, which is the first embodiment of the present invention.

Firstly, an image A corresponding to the cutout area 1 shown in FIG. 5(a) is displayed. After five seconds, an image B corresponding to the cutout area 2 shown in FIG. 5(*b*) is displayed. After another five seconds, an image C corresponding to the cutout area 3 shown in FIG. 5(*c*) is displayed. Then, after yet another five seconds, the image A corresponding to the cutout area 1 shown in FIG. 5(*a*) is displayed. Thereafter, the images A, B, and C are repeatedly displayed in order at the interval speed of five seconds. An order of displaying the images corresponding to the cutout areas in the first embodiment is as follows: the images are repeatedly displayed in order from a smaller numerical number within each framework displayed in the cutout setting area Z (1→2→3→1→ . . . ).

Next, with reference to a flowchart in FIG. 6, a procedure of the CPU 22, applied to the surveillance camera 10 in the first embodiment, in the interval display process of the interval display mode will be described. The CPU 22 executes the following procedure, based on the program accommodated in the flash memory not shown.

The CPU 22 is provided with a timer and a counter L not shown. The timer counts a predetermined time period, and times-up when the predetermined time period arrives. When the interval display mode is set, the interval display process is started. At this time, it is determined in a step S1 whether or not the cutout area is set. When NO is determined in the step S1, the interval display process is ended, and when Yes is determined, the process advances to a step S2. In the step 2, the interval speed is set to the timer, i.e., a time-up time period is set. In the above-described first embodiment, five seconds is set as the interval speed, and thus, when a time-up value of five seconds is set to the timer, the timer times-up after an elapse of five seconds from a start. Then, the process advances to a step S3.

In the step S3, a value of the counter L is set to 1. The value of the counter L is equivalent to a cutout area number. Next, the process advances to a step S5 in which it is determined whether or not the cutout area of which the number corresponds to the value of the counter L is set as the cutout area displayed in the interval display mode. In this step, that is, it is determined whether or not the check mark is set to the check box P of the cutout area of which the number corresponds to the value of the counter L.

When NO is determined in the step S5, the process advances to a step S13 so as to increment the value of the counter L by one (L=L+1). Next, the process advances to a step S15 so as to determine whether or not a current value of the counter L is larger than a maximum numeral set. Herein, in the first embodiment, the numeral set as the cutout area framework number is "3", and it is therefore determined whether or not L is larger than 3. When YES is determined in the step S15, the process returns to the step S3, and when NO is determined, the process returns to the step S5.

Moreover, when YES is determined in the step S5, an area to be cut out is set to a cutout area L, and the timer is reset and started (in a step S7). Then, the process advances to a step S9 so as to perform a cutout process for cutting out from the digital image data accommodated in the SDRAM 20, based on the cutout area corresponding to the value of the counter L. Then, the process furthermore performs a D/A converting process and a video-signal converting process, on the digital image data on which the cutout process is performed, so as to output the cutout image (video signal) to the monitoring monitor 12.

Next, the process advances to a step S11 so as to determine whether or not the timer is timed up. In the first embodiment, it is determined whether or not five seconds has been elapsed from the start of the timer. When NO is determined in the step S11, the process returns to the step S9, and when YES is determined, the process advances to the step S13.

In the above-described procedure, when the setting data is inputted from the image processing apparatus 14 to the surveillance camera 10, the CPU 22 accommodates the setting data in the SDRAM 22 and also performs an interrupting process for accommodating the setting data in the flash ROM 26. Thereafter, the procedure is reset, and the process returns to the step S1.

In this way, in the first embodiment, it is possible to output in order a plurality of cutout areas set by the user to the monitoring monitor 12, at the interval speed set by the user, and thus, it becomes possible to monitor a plurality of areas by the single surveillance camera 10.

Second Embodiment

Figure 7:
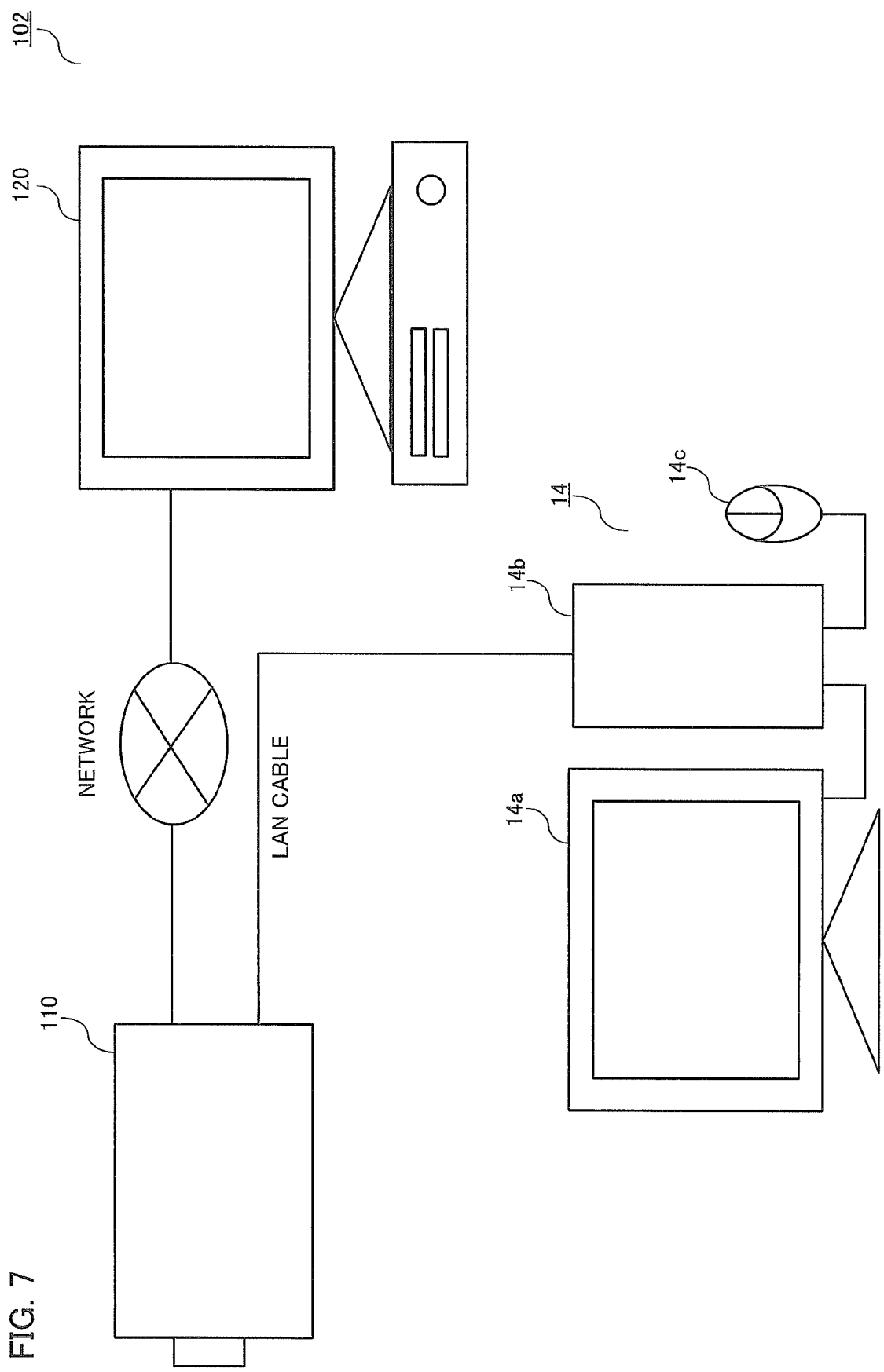
FIG. 7 is a diagram showing a connection example among an image processing apparatus, a surveillance camera, and a monitoring monitor, which is a second embodiment of the present invention.

A second embodiment will be described by using, as another example of the imaging apparatus and the imaging processing system of the present invention, a mode of a surveillance camera system 102 configured by: a surveillance camera 110; an image processing apparatus 14, connected via a LAN cable to the surveillance camera 110, for inputting an image signal outputted from the surveillance camera 110; and an information processing apparatus 120 including a monitor connected via a network to the surveillance camera 110, as shown in FIG. 7.

The second embodiment is characterized by being configured as follows: firstly, a point in which the cutout process is performed on the set cutout area based on an arbitrary zoom factor is added to the cutout process of the interval display mode shown in the first embodiment. Secondly, instead of the process, shown in the first embodiment, in which the image data on which the cutout process is performed is outputted to the monitoring monitor 12, a zoom process (the cutout process and the zoom process herein are combined and these are referred to as a cutout zoom process) is performed on the image data on which the cutout process is performed based on the zoom factor so that the SD size is achieved when being displayed, and in this state, a compressing process is performed, and the compressed image data is outputted to the information processing apparatus 120 via a network. Hereinafter, the surveillance camera system 102 of the second embodiment will be described in detail. However, there are a plurality of points common to those of the first embodiment, and thus, the common points will not be described. Also, regarding FIG. 7 to FIG. 10, it is regarded that blocks to which the same numerals as those in the first embodiment are allotted have common roles/functions/operations, etc., and thus, its description will be omitted.

Figure 8:
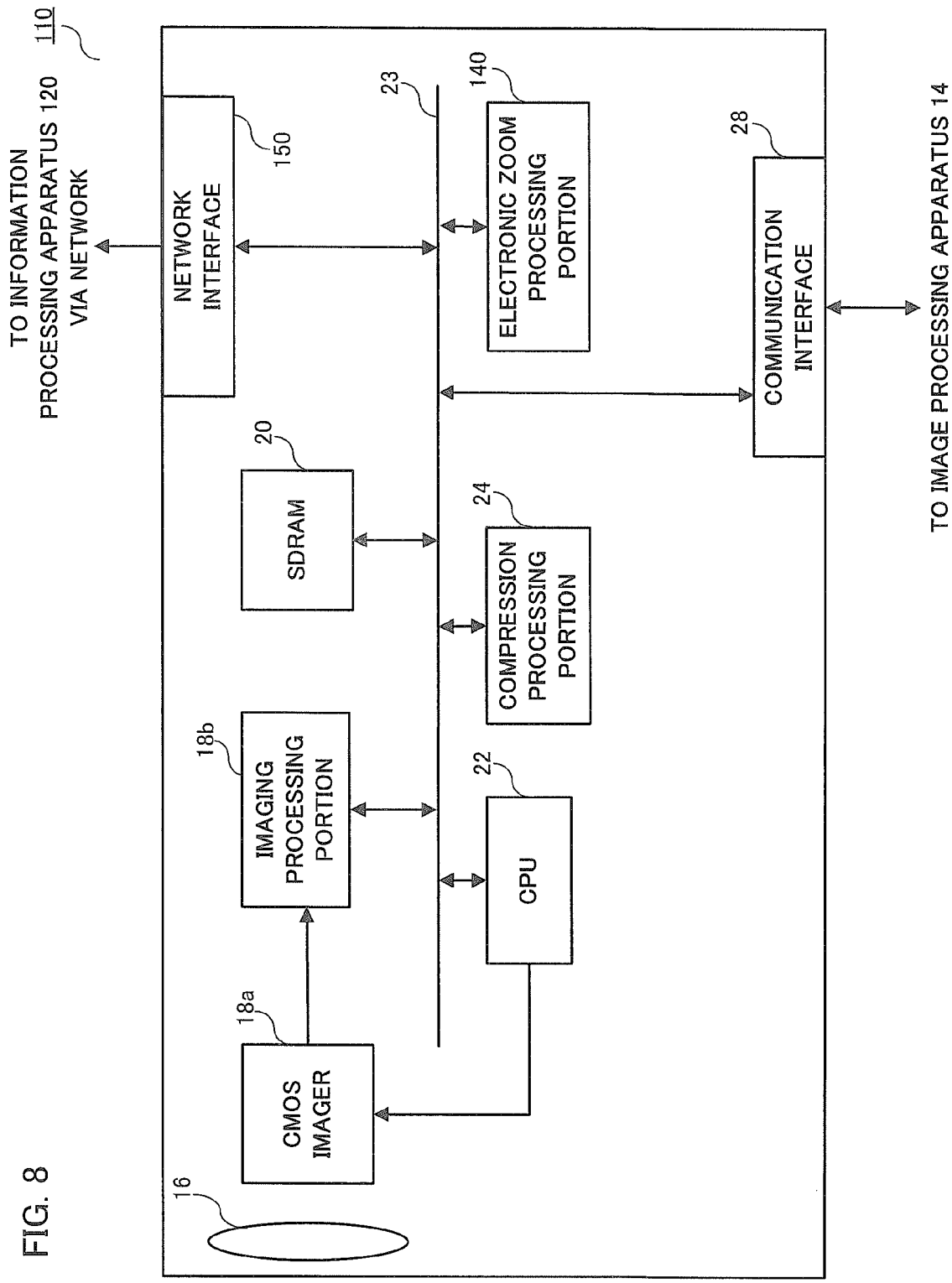
FIG. 8 is a block diagram showing a configuration of the surveillance camera, which is the second embodiment of the present invention.

FIG. 8 is a block diagram of the surveillance camera 110. The surveillance camera 110 differs from the surveillance camera 10 in the first embodiment in that an electronic zoom processing portion 140 and a network interface 150 are arranged whereas the D/A converting portion 27, the video encoder 29, and the video-signal output interface 31 in the first embodiment are deleted.

In terms of operation, the second embodiment differs from the first embodiment in that when performing the cutout process by the CPU 22, the cutout area that has been set is modified depending on the zoom factor set in the image processing apparatus 14, and the electronic zoom processing portion 140 is controlled to perform an electronic zoom process on the modified cutout area so that the SD-sized image data is obtained. The image data which is obtained by performing the electronic zoom process and on which the cutout zoom process has been performed is subjected to a compressing process according to an H264 system in the compression processing portion 24, an MPEG system, or a JPEG system, and the zoom-image compressed data produced by the compressing process is accommodated again in the SDRAM 20 via the bus 23. The zoom-image compressed data accommodated in the SDRAM 20 is inputted to the network interface 150, and outputted to the information processing apparatus 120 via the network.

Figure 9:
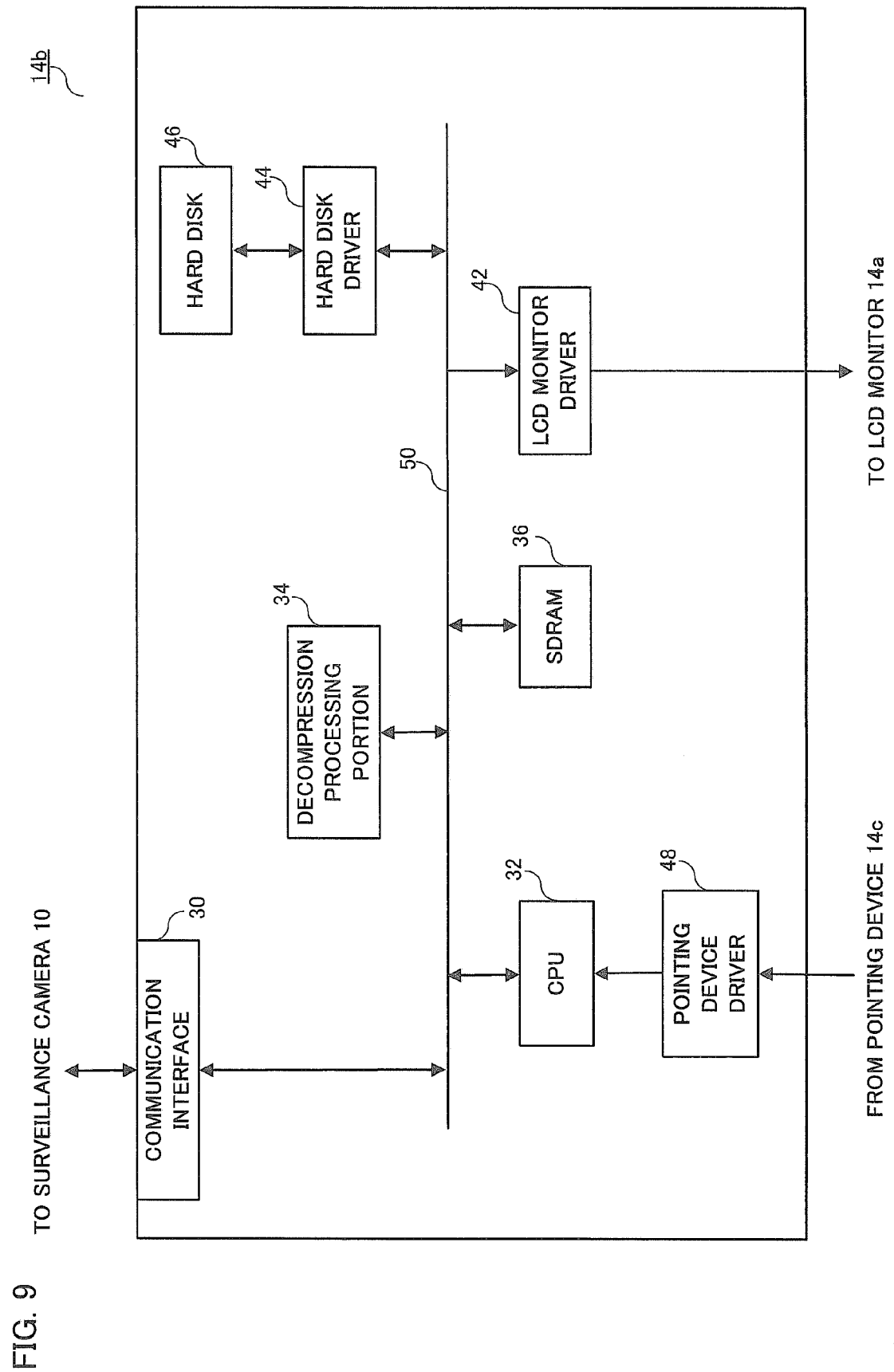
FIG. 9 is a block diagram showing a configuration of the image processing apparatus, which is the second embodiment of the present invention.

FIG. 9 is a block diagram of the image processing apparatus 14b. The second embodiment is different from the first embodiment in that a device for transmitting and receiving the data in the communication interface 30 is the surveillance camera 110. However, the function, the operation, etc., are similar to those in the first embodiment. Thus, the description therefor will be omitted.

Figure 10:
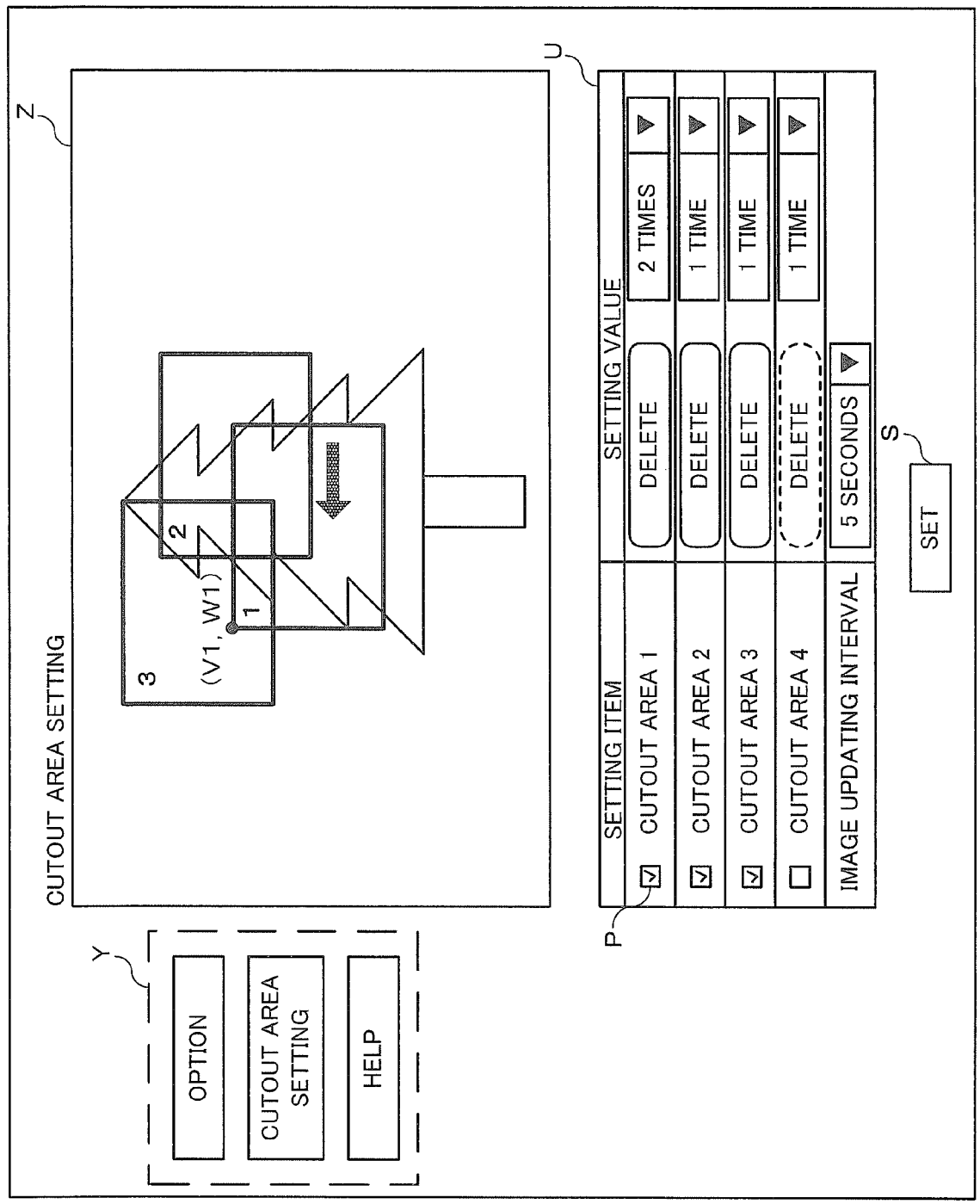
FIG. 10 is an illustrative view showing a setting screen of an interval display mode displayed on an LCD monitor 14a, which is the second embodiment of the present invention.

Next, the display setting process for setting the interval display mode in the second embodiment will be described by using FIG. 10. The display setting process in the second embodiment is substantially similar to the display setting process in FIG. 4 in the first embodiment. However, a difference is that in the setting modifying area U, a pull-down button or mark is arranged, adjacently to "DELETE", as the setting value corresponding to "cutout area ○" such as "cutout area 1". The user performs the left-click manipulation on "▼" in the pull down button by using the pointing device 14c. Then, when the left-click manipulation is performed on the zoom factor desired by the user, out of a plurality of zoom factors such as "0.5 times", "1 time", "1.5 times", "2 times", and "3 times", each of which is displayed in a vertical direction, the zoom factor is selected.

Similarly to the first embodiment, when the pointing device 14c is manipulated by the user, the setting data relating to the set cutout area, the interval speed, the zoom factor, the number, etc., are outputted to the surveillance camera 110. The CPU 22 of the surveillance camera 110 performs the interval display process in the interval display mode based on the setting data inputted from the image processing apparatus 14.

The interval display process in the second embodiment is substantially similar to the operation shown in FIG. 5 in the first embodiment. However, instead of the cutout process in the first embodiment, the cutout zoom process in which the cut out and the zoom process are performed according to the set zoom factor is executed in the second embodiment.

The cutout zoom process will be described with reference to FIGS. 11(a) and 11(b). FIG. 11(a) expresses an image A corresponding to the set cutout area 1. Herein, when the pointing device 14c is manipulated, the zoom factor is modified. Then, the cutout zoom process is executed. In this case, as shown in FIG. 10, the cutout zoom process will be described in detail by using an example in which the zoom factor of "2 times" is set to the "cutout area 1".

The CPU 22 firstly calculates a center point C of the image A corresponding to the set cutout area 1. Based on the calculated center point C, the set zoom factor (2 times) is applied so as to newly set a cutout area that should be cut out. Then, the electronic-zoom processing portion 140 is controlled to perform the electronic zoom process for electronically enlarging the newly set cutout area in order to obtain the SD-sized image. FIG. 11(b) shows an image A' on which the electronic zoom process is performed.

Therefore, in the interval display process in the second embodiment, the image that has complied with the zoom factor set to each of the set cutout areas is subjected to a predetermined process such as a compressing process at the set interval speed and in set sequence, and in this state, the resultant image is outputted to the information processing apparatus 120.

Figure 12:
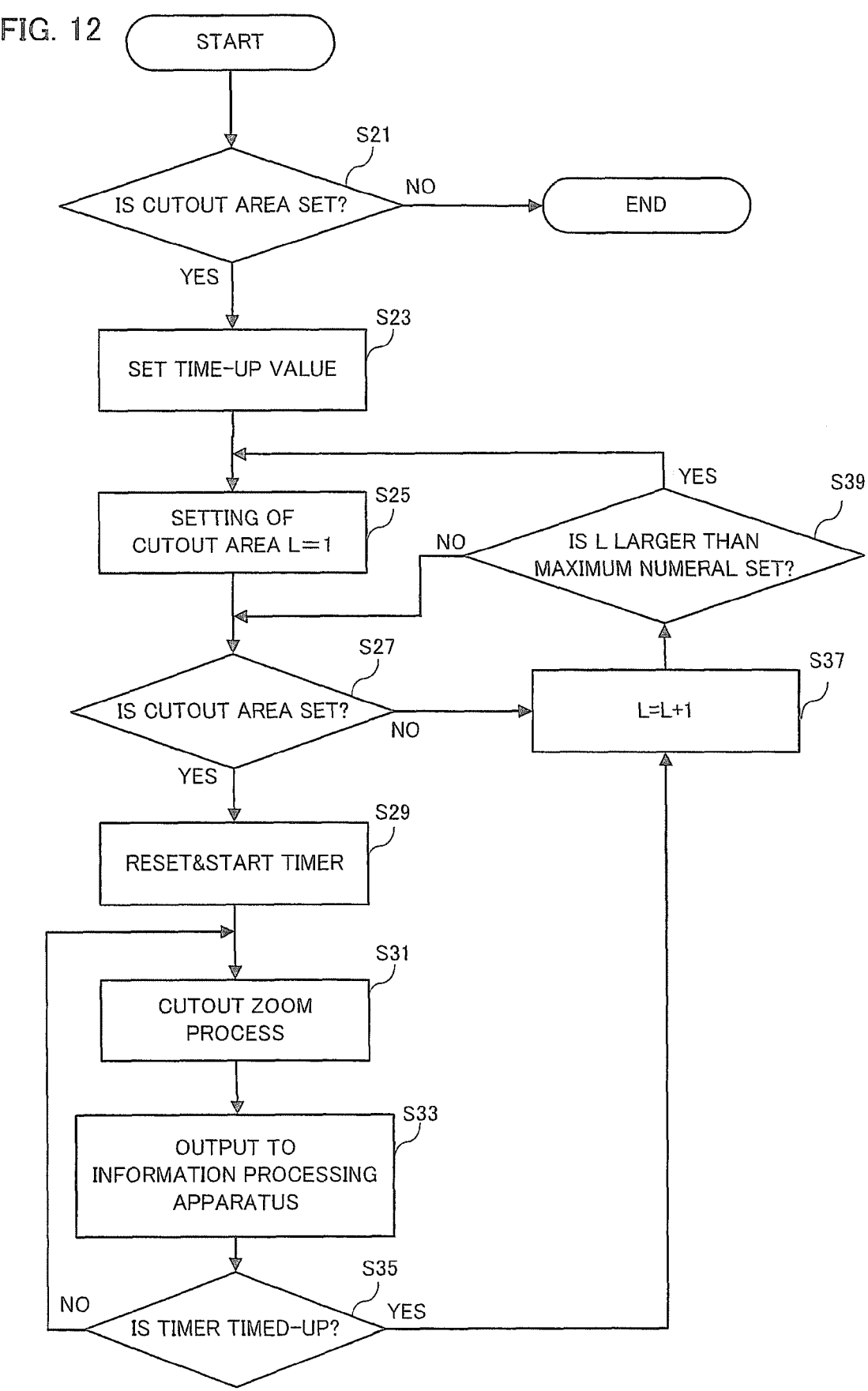
FIG. 12 is a flowchart showing one portion of an operation of the surveillance camera, which is the second embodiment of the present invention.

Next, with reference to a flowchart in FIG. 12, a procedure of the CPU 22 in the interval display process in the interval display mode applied to the surveillance camera 110 in the second embodiment will be described. The CPU 22 executes the following procedure, based on the program accommodated in the flash memory not shown.

Processes from a step S21 to a step S27 are similar to the step S1 to the step S5, which is the procedure of the CPU 22 in the interval display process in the interval display mode applied to the surveillance camera 10 in the first embodiment, and thus, its description will be omitted.

When YES is determined in a step S27, the process advances to a step S29 to reset and start the timer. Then, the process advances to a step S31, and based on the cutout area and zoom factor corresponding to the value of the counter L, the cutout process for cutting out from the digital image data accommodated in the SDRAM 20 is performed, and the electronic-zoom processing portion 140 is controlled to perform the electronic zoom process (cutout zoom process) so as to obtain the SD-sized image. Thereafter, the process advances to a step S33 in which the compression processing portion 24 is controlled to perform the compressing process on the image data on which the cutout zoom process is performed, and the resultant image data is outputted to the information processing apparatus 120.

Then, the process advances to a step S35 so as to determine whether or not the timer is timed up. When NO is determined in the step S35, the process returns to the step S31, and when YES is determined, the process advances to a step S37.

Processes from the step S37 to a step S39 are similar to the step S13 to the step S15, which is the procedure of the CPU 22 in the first embodiment, and thus, its description will be omitted.

In this way, in the second embodiment, it is possible to output in order a plurality of cutout areas set by the user to the information processing apparatus 120, at the interval speed and the zoom factor set by the user, and thus, it becomes possible to monitor in a greater detail a plurality of areas by the single surveillance camera 110. At this time, the zoom process according to the zoom factor is the electronic zoom process, and different from an optical zoom process for performing a zoom process by mainly concentrating on an optical image of a subject, it is possible to zoom the cutout area set by the user, and thus, it is possible for the user to monitor an enlarged/reduced image of a desired cutout area.

It is noted that the image processing apparatus 14 in the second embodiment is configured by the LCD monitor 14a, the signal processing apparatus 14b, and the pointing device 14c. However, the signal processing apparatus 14b may be a so-called personal computer. In this case, the program for executing various types of setting screen displays in this embodiment is accommodated in a recording medium, and when the program is installed by the user, the personal computer executes various processes. The decompressing process in the decompression processing portion 34 is executed by the CPU 32.

Also, the surveillance camera system 2 or 102 in the first or second embodiment is configured by the surveillance camera 10 or 110, the image processing apparatus 14, and the monitoring monitor 12 or the information processing apparatus 120, and the image corresponding to the cutout area is outputted to the monitoring monitor 12 or the information processing apparatus 120. However, the image corresponding to the cutout area may be displayed on the LCD monitor 14a of the image processing apparatus 14 without connecting the monitoring monitor 12 or the information processing apparatus 120. In that case, the CPU 32 decompresses the compressed image data outputted from the surveillance camera 10 or 110, in the decompression processing portion 34, accommodates the decompressed digital image data in the SDRAM 36, cuts out the image corresponding to the cutout area that should be outputted, and accommodates the resultant image again in the SDRAM 36. Then, the digital image data is outputted to the LCD monitor driver 42 so as to display the image on the LCD monitor 14a.

Moreover, in the surveillance camera 10 in the first embodiment, the order of outputting the images corresponding to the set cutout area 1, cutout area 2, and cutout area 3 to the monitoring monitor 12 or the information processing apparatus 120 is the order of outputting the image corresponding to the area as follows: the cutout area 1→the cutout area 2→the cutout area 3→the cutout area 1, . . . . However, this order may be modified by the manipulation of the user. It may be also possible to so set that the image corresponding to the cutout area 2 is not outputted. In that case, the images corresponding to the area may be outputted in the order of the cutout area 1→the cutout area 3→the cutout area 1, . . . .

Furthermore, in the surveillance camera 10 or 110 in the first or second embodiment, the CPU 22 controls the imaging processing portion 18b, the compression processing portion 24, and the D/A converting portion 27 to execute each process in the respective blocks. However, these may be configured by an ASIC (Application Specific Integrated Circuit). In this case, each process is executed as a result of the CPU 22 being setting a predetermined value to a register not shown.

In the first or second embodiment, the size of one frame of digital imaging data, which is a cutout source of each cutout area is configured by the size of 1920×1080 (vertical×horizontal) pixels (aspect ratio of 16:9). However, the size may be 1600×1200 pixels (aspect ratio of 4:3).

In the surveillance camera system 102 in the second embodiment, the setting values within the setting modifying area U of which the zoom factors are displayed on the monitor of the image processing apparatus 14 are modified/set as a result of the user being selecting from the pull-down button. However, the following may also be possible: the pointing device 14c is manipulated to set the cursor within a rectangular framework corresponding to the cutout area displayed in the cutout setting area Z, and in this state, a left double-click is performed to increase the zoom factor and a right double-click is performed to decrease the zoom factor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A single monitoring camera, comprising:
an imager which repeatedly outputs image data representing a scene captured on a single imaging surface;
a storage element which stores a size and a position of each of a plurality of different cutout areas, each of said plurality of cutout areas having a unique identification number assigned on said imaging surface, in accordance with a user operation; and
an outputter which outputs a plurality of sets of display images, each set of the plurality of sets of display images representing a scene corresponding to the single cutout area stored in the storage element;
wherein the outputter outputs to a monitor device the sets of display images, corresponding to the cutout areas, in continual repetitive sequential order of the identification numbers assigned to the cutout areas at a predetermined interval.

2. A single monitoring camera according to claim 1, further comprising a creator which creates display image data representing a scene belonging to each of the plurality of cutout areas based on the image data outputted from said imager,
wherein a resolution of the image data outputted from said imager is higher than the resolution of said monitor device, and the resolution of the display image data created by said creator is equivalent to the resolution of said monitor device.

3. A single monitoring camera according to claim 1, further comprising a creator which creates display image data representing a scene belonging to each of the plurality of cutout areas based on the image data outputted from said imager,
wherein a zoom magnification for each of the plurality of cutout areas is stored in said storage element, and said creator includes a zoom processor which performs a zoom process in accordance with the zoom magnification stored in said storage element.

4. A single monitoring camera according to claim 1, wherein the outputter outputs in real time.

5. A single monitoring camera according to claim 1, wherein the outputter outputs the sets of display images at a predetermined interval by using a timer.

6. An imaging system provided with a single monitoring camera and an image processing apparatus:
said single monitoring camera, comprising:
an imager which repeatedly outputs image data representing a scene captured on a single imaging surface;
a storage element which stores a size and a position of each of a plurality of different cutout areas, each of said plurality of different cutout areas having a unique identification numbers assigned on said imaging surface, in accordance with a user operation;
a designator which sequentially designates each of the plurality of cutout areas stored in said storage element, in an order of the identification numbers; and an outputter which outputs the display image data-designated by said designator to a monitor device, at a predetermined interval, and
said image processing apparatus, comprising:
a display processor which displays on a displayer an image based on the image data;
an area designator which designates a plurality of arbitrary areas on the image displayed by said displayer; and
an outputter which outputs to said imaging apparatus the plurality of arbitrary areas designated by said designator;
wherein, the display image data designated by the designator and outputted by the outputter represents a plurality of sets of display images for each of the plurality of the cutout areas.

7. An imaging system provided with single monitoring camera and an image processing apparatus:
said single monitoring camera, comprising:
an imager which repeatedly outputs image data representing a scene captured on a single imaging surface, and
said image processing apparatus, comprising:
an image receiver which receives said image data;
a storage element which stores a size and a position of each of a plurality of different cutout areas, each of said plurality of cutout areas having a unique identification number assigned on said imaging surface, in accordance with a user operation; and an outputter which outputs a plurality of sets of display images, each set of the plurality of sets of display images representing a scene corresponding to the single cutout area stored in the storage element;

wherein the outputter outputs to a monitor device the sets of display images, corresponding to the cutout areas, in continual repetitive sequential order of the identification numbers assigned to the cutout areas at a predetermined interval.

\* \* \* \* \*